United States Patent
Beppu et al.

(10) Patent No.: US 7,300,806 B2
(45) Date of Patent: Nov. 27, 2007

(54) PROCESS FOR PRODUCING FINE PARTICLES OF BISMUTH TITANATE

(75) Inventors: Yoshihisa Beppu, Yokohama (JP);
Kazuo Sunahara, Yokohama (JP);
Hiroyuki Tomonaga, Yokohama (JP);
Kumiko Takahashi, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 255 days.

(21) Appl. No.: 11/223,984

(22) Filed: Sep. 13, 2005

(65) Prior Publication Data

US 2006/0008928 A1  Jan. 12, 2006

Related U.S. Application Data

(63) Continuation of application No. PCT/JP2004/003285, filed on Mar. 12, 2004.

(30) Foreign Application Priority Data

Mar. 20, 2003 (JP) .............................. 2003-078134

(51) Int. Cl.
*H01L 21/00* (2006.01)
(52) U.S. Cl. .......................... 438/3; 438/584; 977/775; 977/776; 977/900
(58) Field of Classification Search .................... 438/3, 438/584; 977/775, 776, 900
See application file for complete search history.

(56) References Cited

U.S. PATENT DOCUMENTS 4,569,775 A     2/1986  Kubo et al.
4,668,500 A  *  5/1987  Yamanoi et al. ............ 423/598

FOREIGN PATENT DOCUMENTS

| JP | 60-33216     |   | 2/1985 |
|----|--------------|---|--------|
| JP | 61-86423     |   | 5/1986 |
| JP | 61158824 A   | * | 7/1986 |
| JP | 62176915 A   | * | 8/1987 |
| JP | 63-100930    |   | 5/1988 |
| JP | 07-202295    |   | 8/1995 |

* cited by examiner

*Primary Examiner*—Michelle Estrada
*Assistant Examiner*—Jarrett J Stark
(74) *Attorney, Agent, or Firm*—Oblon, Spivak, McClelland, Maier & Neustadt, P.C.

(57) ABSTRACT

It is an object to provide fine particles of bismuth titanate having excellent dielectric characteristics, high crystallinity and a small particle diameter, and a process for their production. The object is accomplished by a process which comprises a step of obtaining a melt comprising, as represented by mol % based on oxides, from 23 to 72% of $Bi_2O_3$, from 4 to 64% of $TiO_2$ and from 6 to 50% of $B_2O_3$, a step of quickly quenching this melt to obtain an amorphous material, a step of crystallization of bismuth titanate crystals from the above amorphous material, and a step of separating the bismuth titanate crystals from the obtained crystallized material, in this order.

10 Claims, No Drawings

PROCESS FOR PRODUCING FINE PARTICLES OF BISMUTH TITANATE

TECHNICAL FIELD

The present invention relates to a process for producing fine particles of bismuth titanate excellent in dielectric characteristics, particularly to a process for producing fine particles of bismuth titanate having high crystallinity and a small particle diameter.

BACKGROUND ART

Titanate ceramics are widely used as constituting materials for electronic components such as capacitors, filters and transducers, since they have excellent characteristics such as insulation properties, ferroelectricity, piezoelectric properties, pyroelectricity and semiconducting properties. Such ceramics can be prepared by a solid state reaction method wherein raw materials comprising oxides or carbonates are mixed in a wet system, pulverized, dried and calcined. However, ceramics obtained by such a solid phase reaction method are in the form of aggregated or coarse grains and thus require a mechanical pulverization operation by e.g. a ball mill method. Accordingly, they have a drawback that impurities from the pulverization container or pulverization medium are likely to be included. Further, by such a pulverization operation, it is at best possible to obtain a powder of a micron order or a submicron order, and it is not possible to obtain fine particles (nano powder) having a particle diameter of less than the submicron order.

As a method for obtaining homogeneous fine ceramic particles having higher purity and a small particle diameter, a wet system preparation method such as a spray pyrolysis method, a coprecipitation method, a sol-gel method, an alkoxide method, an oxalate method or a hydrothermal synthesis method, has been proposed. However, even when a spray pyrolysis method, a coprecipitation method, a sol-gel method, an alkoxide method or an oxalate method is employed, a mechanical pulverization operation will be required in order to obtain a nano powder, whereby inclusion of impurities from the pulverization container or pulverization medium will be a problem like in the case of the solid state reaction method. Therefore, a case is limited wherein such a method can be used for the synthesis of fine ceramic particles.

In a hydrothermal synthesis method which requires no pulverization step, the synthesis is carried out under a high temperature and high pressure conditions, whereby it is not easy to set the conditions for the synthesis, and it is not easy to judge the terminal point of the synthesis. Accordingly, it is difficult to control the particle size and the particle size distribution of the desired product.

Further, fine ceramic particles synthesized by such a wet system preparation method, contain OH groups, etc. particularly on their edges and faces and thus tend to be inadequate from the viewpoint of crystallinity. Thus, none of the above methods was useful as a means to synthesize homogeneous fine ceramic particles having high purity and high dielectric characteristics, which can be used as a constituting material for electronic components.

Further, by the gas phase reaction method, it is difficult to obtain a material in a particle form, the productivity is low, the cost is high, and the apparatus tends to be of a large scale. Therefore, the gas phase reaction method is rarely employed as a means to synthesize fine particles of titanate ceramics.

On the other hand, U.S. Pat. No. 4,569,775 discloses a process for producing a magnetoplumbite type ferrite powder by a glass crystallization method wherein glass is heat-treated at a temperature of at least the glass transition point to precipitate ceramic crystals in a glass matrix, and then, the glass is dissolved and removed with a weak acid to separate only the crystallites. Such a glass crystallization method is effective as a means to synthesize high purity ceramic particles in a case where substances other than the crystallites can be completely removed and has a characteristic that control of the shape of the particles is thereby easy.

Bismuth titanate as one of ceramics for electronic components, has excellent characteristics such that the Curie point is high, it has a large remanence, and the temperature dependency of resonance frequency is low, and it is thus expected to be useful as a constituting material for semiconductor memories of the next generation. At present, a solid state reaction method is employed for the synthesis of bismuth titanate particles. However, recently, it is desired to develop a process for producing fine particles of bismuth titanate which have higher crystallinity, a small particle diameter and excellent dielectric characteristics.

DISCLOSURE OF THE INVENTION

In view of the above-mentioned problems of the prior art, it is an object of the present invention to provide a process for producing fine particles of bismuth titanate excellent in dielectric characteristics, particularly a process for producing fine particles of bismuth titanate having high crystallinity and a small particle diameter.

The present invention provides a process for producing fine particles of bismuth titanate, which comprises a step of obtaining a melt comprising, as represented by mol % based on oxides, from 23 to 72% of $Bi_2O_3$, from 4 to 64% of $TiO_2$ and from 6 to 50% of $B_2O_3$, a step of quickly quenching this melt to obtain an amorphous material, a step of crystallization of bismuth titanate crystals from the above amorphous material, and a step of separating the bismuth titanate crystals from the obtained crystallized material, in this order.

BEST MODE FOR CARRYING OUT THE INVENTION

In the present invention, as constituting materials to obtain the melt comprising $Bi_2O_3$, $TiO_2$ and $B_2O_3$, it is possible to employ bismuth oxide ($Bi_2O_3$) or bismuth oxycarbonate (($BiO)_2CO_3$), rutile or anatase (each being $TiO_2$), and boron oxide ($B_2O_3$) or boric acid ($H_3BO_3$). In addition to these materials, bismuth borate or bismuth fluoride may, for example, be added to adjust the melting temperature.

The purity of the above constituting materials is not particularly limited so long as it is within a range not to lower the desired characteristics, but it is preferred to employ materials having a purity of at least 99%, more preferably at least 99.9%. Further, the particle size of the constituting materials is not particularly limited so long as it is within a range where a uniform melt can be obtained when they are melted. Further, it is preferred to mix the constituting materials in a dry or wet system by using a mixing/pulverization means such as a ball mill or a planetary mill, before melting them.

Melting may be carried out in the atmospheric air but is preferably carried out while the oxygen partial pressure or the oxygen flow rate is controlled. Here, the crucible to be used for the melting is preferably made of alumina, platinum or rhodium-containing platinum, but a refractory may also be used. Further, it is preferred to carry out the melting by means of a resistance heating furnace, a radio-frequency induction furnace or a plasma arc furnace. The resistance heating furnace is preferably an electric furnace provided with a heating element made of a metal such as a nichrome alloy, silicon carbide or molybdenum silicide. The radio-frequency induction furnace may be one which is provided with an induction coil, so that the output can be controlled, and the plasma arc furnace may be one wherein carbon or the like is used for electrodes, so that plasma arc thereby generated can be utilized. The melting is preferably carried out at a temperature of at least 1,200° C., and the obtained melt may be stirred.

The mixture having the constituting materials mixed, may be melted in a powder state, or a preliminarily molded mixture may be melted. In a case where a plasma arc furnace is employed, a preliminarily molded mixture may be melted as it is and then quickly quenched.

The composition of the melt comprises, as represented by mol % based on oxides, from 23 to 72% of $Bi_2O_3$, from 4 to 64% of $TiO_2$ and from 6 to 50% of $B_2O_3$. This composition corresponds also to the chemical composition of the constituting materials before melting. In a case where a melt having the desired composition can not be obtained due to e.g. evaporation of the constituting materials during the melting operation, the ratio of the constituting materials to be added may be adjusted.

The melt having the above compositional ranges is preferred, since it has a proper viscosity, and an amorphous material can be obtained by the subsequent quick quenching operation without crystallization of the melt. A melt having a composition wherein $Bi_2O_3$ exceeds 72% or $TiO_2$ exceeds 64%, and $B_2O_3$ is less than 7%, is likely to crystallize by the quick quenching, and it tends to be difficult to form it into an amorphous material by vitrification, whereby it tends to be difficult to obtain fine particles of bismuth titanate having the desired characteristics. It is more preferred that the melt comprises from 30 to 50% of $Bi_2O_3$, from 15 to 30% of $TiO_2$ and from 15 to 30% of $B_2O_3$, whereby it is readily possible to obtain $Bi_4Ti_3O_{12}$ having excellent characteristics such that the dielectric polarization is large and the temperature dependency of the resonance frequency is small, and its yield can be made high. If it has a composition wherein $Bi_2O_3$ is less than 23%, $TiO_2$ is less than 4% and $B_2O_3$ exceeds 50%, the amount of bismuth titanate crystals to be crystallized, tends to be small, such being undesirable.

Next, for the step of quickly quenching the obtained melt to obtain an amorphous material, it is preferred to use a method of dropping the melt into twin rollers rotated at a high speed to obtain a flaky amorphous material, or a method of winding up a fibrous amorphous material (continuous fiber) continuously from the melt by a drum rotating at a high speed. Here, as such twin rollers and a drum, ones made of metal or ceramics may be employed. Otherwise, a fibrous amorphous material (short fiber) may be obtained by using a spinner having pores formed on its side wall and rotating at a high speed. By means of such apparatus, the melt can effectively be quickly quenched to obtain an amorphous material of high purity.

It is preferred to carry out the quick quenching so that, when the amorphous material is flaky, its thickness would be at most 200 μm, more preferably at most 100 μm, or when it is fibrous, its diameter would be at most 50 μm, more preferably at most 30 μm. If the quick quenching is carried out so as to form an amorphous material having a thickness or diameter more than this level, the melt tends to be readily crystallized, such being undesirable.

The step of crystallization of bismuth titanate crystals from the amorphous material is preferably carried out at a temperature of from 500 to 700° C. If the temperature is lower than 500° C., it tends to be difficult to precipitate crystals even if such heating is carried out continuously for about 24 hours, and if it exceeds 700° C., the crystallized material containing the amorphous material is likely to fuse, thus either case being undesirable. More preferably, the crystallization is carried out at a temperature of from 550 to 600° C. This step of crystallization comprises two steps of formation of nucleiation and the subsequent crystal growth, and these two steps may be carried out at different temperatures. Further, the higher the temperature for heating, the larger the particle diameter of crystals to be crystallized. Accordingly, the crystallization temperature may be set depending upon the desired particle diameter. In the crystallization, it is preferred to maintain the temperature within the above range for from 4 to 48 hours, whereby bismuth titanate can sufficiently be crystallized. The longer the retention time, the larger the particle diameter of crystals to be crystallized. Accordingly, the retention time may be set depending upon the desired particle diameter.

Here, it is preferred that the composition of bismuth titanate crystals to be obtained by the crystallization is at least one member selected from the group consisting of $Bi_8TiO_{14}$, $Bi_3Ti_3O_{12}$, $Bi_2Ti_2O_7$ and $Bi_2Ti_4O_{11}$. In the present invention, by the crystallization of the amorphous material, bismuth titanate will mainly be crystallized as crystals. Bismuth borate ($Bi_4B_2O_9$, $Bi_3B_5O_{12}$, $BiBO_3$ or $BiB_3O_6$) or the like may also be crystallized, but in such a case, it may be removed by the subsequent eluviation treatment. It is preferred that the bismuth titanate crystals have a plate-shape or a needle-shape and have an aspect ratio of at least 2, whereby the filling ratio in the electronic material can be made high.

Next, the bismuth titanate crystals are separated from the crystallized material containing the bismuth titanate crystals, obtained as described above. By using an acid or water, substances other than the bismuth titanate crystals can easily be removed from the crystallized material by eluviation. As such an acid, it is possible to employ an inorganic acid such as acetic acid, hydrochloric acid or nitric acid or an organic acid such as oxalic acid or citric acid. Further, in order to accelerate the reaction, the acid or water may be warmed, or ultrasonic irradiation may be used in combination. By such eluviation treatment, a part of bismuth titanate crystals may sometimes be dissolved, such being rather preferred from a viewpoint such that the particle diameter can thereby be made uniform.

After the eluviation treatment, washing with pure water may be carried out as the case requires, to obtain fine particles of bismuth titanate. The average particle diameter (median diameter) of the fine particles of bismuth titanate is preferably from 5 to 1,000 nm, particularly preferably from 10 to 200 nm.

Now, the present invention will be described in further detail with reference to Examples. However, it should be understood that the present invention is by no means thereby restricted.

EXAMPLES 1 TO 14

Bismuth carbonate, rutile and boron oxide were, respectively, weighed so that they would be in the proportions as shown in Table 1, as represented by mol % based on $Bi_2O_3$, $TiO_2$ and $B_2O_3$, respectively, and by an addition of a small amount of ethanol, they were mixed and pulverized by an automatic triturator, followed by drying to obtain a raw material powder.

The obtained raw material powder was put into a crucible made of platinum containing 10 mass % of rhodium and equipped with a nozzle, and heated at 1,350° C. for two hours in an electric furnace using molybdenum silicide as a heating element, whereby it was completely melted.

Then, while the lower end of the nozzle was heated by the electric furnace, the melt was dropped and passed through twin rollers having a diameter of about 15 cm and rotating at 300 rpm, whereby droplets were quickly quenched to obtain a flaky solid material. The obtained flakes were a transparent amorphous material. The thickness of the flakes was measured by a micrometer and found to be from 80 to 150 μm.

Using a part of the obtained flakes, the crystallization temperature was preliminarily measured by a differential scanning calorimeter (DSC), and the flakes were heated for 12 hours at the temperature shown in Table 1, which was higher by from 20 to 100° C. than the crystallization temperature, to have plate-shaped bismuth titanate crystals precipitated.

Then, the flakes after the crystallization treatment was left to stand for 20 hours in a 1 mol/L acetic acid solution at 70° C. to eluviate soluble substances. The eluviated liquid was subjected to centrifugal separation, and after discarding the supernatant, the residue was washed with water, further dispersed under high pressure, dried and further washed with water and dried to obtain fine particles of bismuth titanate having a particle diameter of from 20 to 150 nm.

The mineralogical composition of the obtained fine particles of bismuth titanate was identified by means of an X-ray diffraction apparatus. The results are shown in Table 1 together with the chemical composition (mol %) and the actual heating temperature (° C.). In Table 1, B8T1 represents $Bi_8TiO_{14}$, B4T3 $Bi_4Ti_3O_{12}$, B2T2 $Bi_2Ti_2O_7$, and B2T4 $Bi_2Ti_4O_{11}$.

TABLE 1

| | Chemical composition | | | Heating | Mineralogical |
| --- | --- | --- | --- | --- | --- |
| | $Bi_2O_3$ | $TiO_2$ | $B_2O_3$ | temperature | composition |
| Ex. 1 | 23.5 | 64.0 | 12.5 | 580 | B8T1 |
| Ex. 2 | 25.8 | 53.3 | 20.8 | 580 | B8T1 |
| Ex. 3 | 38.0 | 12.0 | 50.0 | 580 | B4T3 |
| Ex. 4 | 38.3 | 20.0 | 41.7 | 600 | B4T3 |
| Ex. 5 | 38.8 | 30.0 | 31.2 | 600 | B4T3 |
| Ex. 6 | 39.2 | 40.0 | 20.8 | 600 | B4T3 |
| Ex. 7 | 39.5 | 48.0 | 12.5 | 620 | B4T3 |
| Ex. 8 | 42.9 | 42.9 | 14.2 | 600 | B4T3 |
| Ex. 9 | 43.8 | 37.5 | 18.7 | 600 | B4T3 |
| Ex. 10 | 45.0 | 30.0 | 25.0 | 620 | B2T2 + B4T3 |
| Ex. 11 | 48.9 | 40.0 | 11.1 | 620 | B2T2 + B4T3 |
| Ex. 12 | 51.1 | 26.7 | 22.2 | 620 | B2T2 |
| Ex. 13 | 51.7 | 6.7 | 41.7 | 600 | B8T1 |
| Ex. 14 | 71.5 | 16.0 | 12.5 | 620 | B2T4 |

As a result of the X-ray diffraction, the fine particles of bismuth titanate obtained in each of Examples 1 to 14 were particles having high crystallinity.

Then, the particle size distributions of the fine particles of bismuth titanate obtained in Examples 4 and 10 were measured by a dynamic light scattering method and found to be of a monopeak mode, and they were very fine particles with a median diameter of 120 nm in Example 4 and a median diameter of 140 nm in Example 10.

Further, with respect to Example 5, the shape was observed by means of TEM (transmission electron microscope) and was found to be plate-shaped crystals, whereby each of crystallographic axes a and b was 80 nm, axis c was 22 nm. The aspect ratio calculated therefrom was 3.6.

EXAMPLE 15

Fine particles of bismuth titanate were obtained in the same manner as in Example 4 except that the flakes were heated for 12 hours at 650° C. to have bismuth titanate crystals precipitated. The particle size distribution was measured in the same manner as in Example 4 and found to be of a monopeak mode, and they were fine particles having a large diameter as compared with Example 4, i.e. with a median diameter of 150 nm.

EXAMPLE 16

Fine particles of bismuth titanate were obtained in the same manner as in Example 8 except that the flakes were heated for 24 hours at 700° C. to have bismuth titanate crystals precipitated. The particle size distribution was measured in the same manner as in Example 4 and found to be of a monopeak mode, and they were fine particles having a large diameter as compared with Example 4, i.e. with a median diameter of 200 nm.

EXAMPLES 17 TO 27

Bismuth carbonate, rutile and boron oxide were, respectively, weighed so that they would be in the proportions as shown in Table 2, as represented by mol % based on $Bi_2O_3$, $TiO_2$ and $B_2O_3$, respectively, and in the same manner as in Example 1, the mixing/pulverization operation, the melting operation and the quick quenching operation were carried out, then the crystallization operation was carried out at the temperature shown in Table 2, and the eluviation operation was carried out in the same manner as in Example 1, to obtain fine particles of bismuth titanate having a particle diameter of from 20 to 150 nm. The mineral phase of the obtained fine particles of bismuth titanate was identified by means of an X-ray diffraction apparatus and found to be as shown in Table 2.

TABLE 2

| | Chemical composition | | | Heating | Mineralogical |
| --- | --- | --- | --- | --- | --- |
| | $Bi_2O_3$ | $TiO_2$ | $B_2O_3$ | temperature | composition |
| Ex. 17 | 29.3 | 64.0 | 6.7 | 620 | B8T1 + B4T3 |
| Ex. 18 | 31.7 | 26.7 | 41.7 | 600 | B2T4 |
| Ex. 19 | 34.0 | 16.0 | 50.0 | 580 | B2T4 |
| Ex. 20 | 35.6 | 53.3 | 11.1 | 600 | B4T3 |
| Ex. 21 | 45.3 | 48.0 | 6.7 | 620 | B4T3 |
| Ex. 22 | 46.0 | 4.0 | 50.0 | 600 | B2T4 |
| Ex. 23 | 53.3 | 30.0 | 16.7 | 620 | B2T2 + B2T4 |
| Ex. 24 | 57.3 | 16.0 | 26.7 | 600 | B2T2 + B2T4 |
| Ex. 25 | 57.8 | 20.0 | 22.2 | 600 | B2T2 + B2T4 |
| Ex. 26 | 61.3 | 12.0 | 26.7 | 600 | B2T2 + B2T4 |
| Ex. 27 | 65.8 | 13.3 | 20.8 | 600 | B2T4 |

EXAMPLES 28 AND 29 (COMPARATIVE EXAMPLES)

Bismuth carbonate, rutile and boron oxide were, respectively, weighed so that they would be in the proportions shown in Table 3, as represented by mol % based on $Bi_2O_3$, $TiO_2$ and $B_2O_3$, respectively, and in the same manner as in Example 1, the mixing/pulverization operation, the melting operation and the quick quenching operation were carried out, whereby an opaque solid was formed, and no amorphous material was obtained.

EXAMPLE 30 (COMPARATIVE EXAMPLE)

Bismuth carbonate, rutile and boron oxide were, respectively, weighed so that they would be in the proportions shown in Table 3, as represented by mol % based on $Bi_2O_3$, $TiO_2$ and $B_2O_3$, respectively, and subjected to a mixing/pulverization operation and a melting operation, whereby they were not completely melted, and therefore, melting was stopped.

TABLE 3

| | Chemical composition | | |
|---|---|---|---|
| | $Bi_2O_3$ | $TiO_2$ | $B_2O_3$ |
| Ex. 28 | 68.0 | 22.0 | 5.0 |
| Ex. 29 | 90.0 | 5.0 | 5.0 |
| Ex. 30 | 10.0 | 70.0 | 20.0 |

INDUSTRIAL APPLICABILITY

According to the present invention, it is possible to produce fine particles of bismuth titanate having high crystallinity and a small particle diameter. Therefore, the fine particles of bismuth titanate obtained by the present invention may be used as a constituting material for electronic components, whereby the electronic components may be made to be highly densified or light in weight.

The entire disclosure of Japanese Patent Application No. 2003-078134 filed on Mar. 20, 2003 including specification, claims and summary is incorporated herein by reference in its entirety.

What is claimed is:

1. A process for producing fine particles of bismuth titanate, which comprises a step of obtaining a melt comprising, as represented by mol % based on oxides, from 23 to 72% of $Bi_2O_3$, from 4 to 64% of $TiO_2$ and from 6 to 50% of $B_2O_3$, a step of quickly cooling this melt to obtain an amorphous material, a step of crystallization of bismuth titanate crystals from the above amorphous material, and a step of separating the bismuth titanate crystals from the obtained crystallized material, in this order.

2. The process for producing fine particles of bismuth titanate according to claim 1, wherein the melt is quickly quenched to obtain a flaky or fibrous amorphous material.

3. The process for producing fine particles of bismuth titanate according to claim 1, wherein the step of crystallization of bismuth titanate crystals from the amorphous material, is carried out from 500 to 700° C.

4. The process for producing fine particles of bismuth titanate according to claim 1, wherein the compositional formula of the bismuth titanate crystals is at least one type selected from $Bi_8TiO_{14}$, $Bi_4Ti_3O_{12}$, $Bi_2Ti_2O_7$ and $Bi_2Ti_4O_{11}$.

5. The process for producing fine particles of bismuth titanate according to claim 1, wherein the shape of the bismuth titanate crystals is a plate-shape or a needle-shape.

6. The process for producing fine particles of bismuth titanate according to claim 1, wherein the step of separating the bismuth titanate crystals is carried out by using an acid or water.

7. The process for producing fine particles of bismuth titanate according to claim 1, wherein the average particle diameter of the fine particles of bismuth titanate is from 5 to 1,000 nm.

8. The process for producing fine particles of bismuth titanate according to claim 1, wherein the average particle diameter of the fine particles of bismuth titanate is from 10 to 200 nm.

9. Fine particles of bismuth titanate, characterized in that they have at least one compositional formula selected from the group consisting of $Bi_8TiO_{14}$, $Bi_4Ti_3O_{12}$, $Bi_2Ti_2O_7$ and $Bi_2Ti_4O_{11}$, and they have an average particle diameter of from 5 to 1,000 nm and an aspect ratio of at least 2.

10. The process for producing fine particles of bismuth titanate according to claim 9, wherein the average particle diameter of the fine particles of bismuth titanate is from 10 to 200 nm.

* * * * *